United States Patent
Thompson et al.

(10) Patent No.: US 9,984,288 B2
(45) Date of Patent: May 29, 2018

(54) IDENTITY DOCUMENT DIGITAL IMAGE CORRECTION METHOD, SYSTEM AND COMPUTER PROGRAM

(71) Applicant: IDscan Biometrics Limited, London (GB)

(72) Inventors: Tamlyn Sean Thompson, London (GB); Zaher Zeidan, London (GB)

(73) Assignee: GB GROUP PLC, Chester (GB)

( * ) Notice: Subject to any disclaimer, the term of this patent is extended or adjusted under 35 U.S.C. 154(b) by 0 days. days.

(21) Appl. No.: 14/749,724

(22) Filed: Jun. 25, 2015

(65) Prior Publication Data
US 2015/0379345 A1 Dec. 31, 2015

(30) Foreign Application Priority Data
Jun. 25, 2014 (GB) .................................. 1411295.7

(51) Int. Cl.
| | |
|---|---|
| G06K 9/00 | (2006.01) |
| G06K 9/52 | (2006.01) |
| G07D 7/20 | (2016.01) |

(52) U.S. Cl.
CPC ..... *G06K 9/00483* (2013.01); *G06K 9/00463* (2013.01); *G06K 9/00885* (2013.01); *G06K 9/52* (2013.01); *G07D 7/2008* (2013.01)

(58) Field of Classification Search
CPC .......... G06K 9/00483; G06K 9/00885; G06K 9/2081; G06K 9/3216; G06K 9/52;
(Continued)

(56) References Cited

U.S. PATENT DOCUMENTS

2009/0154778 A1* 6/2009 Lei ..................... G06K 9/00456
382/112
2011/0141495 A1* 6/2011 Kuo ................... H04N 1/00034
358/1.8
(Continued)

FOREIGN PATENT DOCUMENTS

| DE | 10 2006 051 710 A1 | 5/2007 |
|---|---|---|
| EP | 2 624 224 A1 | 8/2013 |

OTHER PUBLICATIONS

National Fraud Authority, Fraud Typologies and Victims of Fraud—Literature Review 2009.
(Continued)

*Primary Examiner* — Kim Vu
*Assistant Examiner* — Michael Vanchy, Jr.
(74) *Attorney, Agent, or Firm* — Saul Ewing Arnstein & Lehr LLP

(57) ABSTRACT

An identity document digital image correction method comprising identifying the type, class and issue of a presented identity document from features in a digital image thereof; retrieving from a reference identity document repository, information about a reference authentic version of an identity document of the same type, class and issue as the presented identity document; allowing a user to select at least two features in the digital image of the presented identity document calculating the distance between the two selected features; determining the distance between corresponding features in the reference authentic version of the identity document; calculating a scaling factor $\gamma_{x,y}$ from the ratio of the distance between the two selected features in the presented identity document and the distance between corresponding features in the reference authentic version of the identity document; applying the scaling factor to measure- (Continued)

ments of features in the digital image of the presented identity document.

4 Claims, 1 Drawing Sheet

(58) Field of Classification Search
CPC ............. G06K 9/6232; G06K 9/00087; G06K 9/00221; G06T 7/33; G06Q 20/40145; G06Q 20/4014
See application file for complete search history.

(56) References Cited

U.S. PATENT DOCUMENTS

2013/0034290 A1   2/2013  Lee et al.
2014/0146370 A1*  5/2014  Banner ................ G06K 9/6232
                                                    358/406

OTHER PUBLICATIONS

CIFAS 2012 Fraud Trends, Jan. 17, 2013; retrieved from the Internet on Jun. 3, 2015; URL: https://www.cifas.org.uk/fraudtrendstwentytwelve.
Extended European Search Report, dated Oct. 26, 2015 issued in corresponding EP Application No. 15173036.3.

* cited by examiner

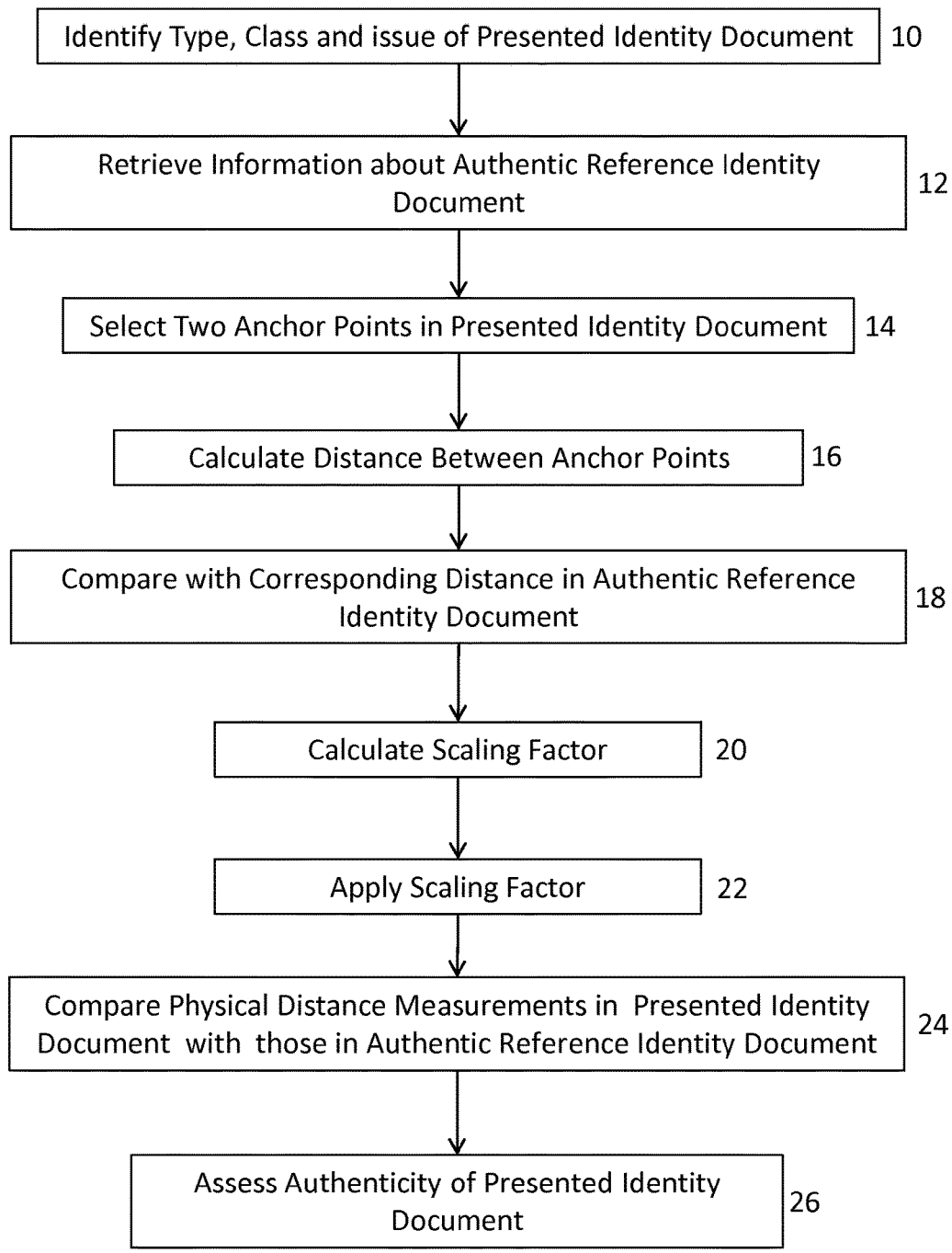

ID ENTITY DOCUMENT DIGITAL IMAGE
CORRECTION METHOD, SYSTEM AND
COMPUTER PROGRAM

CROSS-REFERENCE TO RELATED
APPLICATIONS

This application is based on, and claims priority to, UK Application No. GB 1411295.7, filed Jun. 25, 2014, the entire contents of which is fully incorporated herein by reference.

FIELD OF THE INVENTION

The present invention relates to a correction method, system and computer program for a digital image of an identity document acquired by a digital camera, for use in, without limitation, an identity document verification system.

BACKGROUND OF THE INVENTION

The UK Home Office Identity Fraud Steering Committee defines identity fraud as "when a false identity or someone else's identity details are used to support unlawful activity, or when someone avoids obligation/liability by falsely claiming that he/she was the victim of identity fraud" (National Fraud Authority, Fraud Typologies and Victims of Fraud—Literature Review 2009). Identity fraud usually entails the use of fraudulent, counterfeit or forged identity documents such as a passport or a driving licence. For the sake of clarity, the term "identity document" will be used henceforth to mean documentation provided by a user to support their claim to a specified identity Identity crimes are one of the fastest growing types of fraud in the UK. The UK's Fraud prevention service found that identity fraud accounted for roughly 50% of all frauds recorded in 2012; and that there had been a 9 percent increase in identity frauds, compared with 2011 (CIFAS 2012 Fraud Trends, 17 Jan. 2013). To counter the growth in identity fraud, a number of methods have been developed to improve the security of identity documents. In an ironic parallel with the above-mentioned growth in identity fraud, heightened security concerns and associated security awareness has led to the need for individuals to present identity documents (ID's) in increasing numbers of situations. This has led to a growing need for new identity document equipment that can rapidly read, verify, and analyze many different types of passports, documents of value, identity and security documents which employ the above-mentioned new materials and printing techniques.

In the past, digital images of presented identity documents were acquired by flat-bed scanners or specialised passport/identity card scanners. The digital images were then processed by specialised identity verification software (e.g. IDScan Document Expert System [Trade Mark]) to ascertain from specific features in the digital image, whether the presented identity document was authentic. However, this identity document verification technology, was inherently dependent on a fixed and rather inflexible infrastructure of scanners etc., which does not address the needs of the increasing demands for identity verification solutions in a wide diversity of settings.

However, the emergence of digital cameras in mobile phone devices and the rapid growth and global adoption of mobile phone technologies, have provided an alternative, more flexible solution to the challenges of identity document verification.

SUMMARY OF THE INVENTION

According to the invention there is provided an identity document digital image correction method comprising the steps of:

identifying the type, class and issue of a presented identity document from a plurality of features in a digital image thereof;

retrieving from a reference identity document repository, information about a reference authentic version of an identity document of the same type, class and issue as the presented identity document;

allowing a user to select at least two features in the digital image of the presented identity document calculating the distance between the two selected features;

determining from the information retrieved about the reference authentic version of the identity document, the distance between corresponding features in the reference authentic version of the identity document;

calculating a scaling factor $\gamma_{x, y}$ from the ratio of the distance between the two selected features in the presented identity document and the distance between corresponding features in the reference authentic version of the identity document;

applying the scaling factor to a one or more measurements of features in the digital image of the presented identity document.

Preferably, the step of calculating the distance between the two selected features comprises the step of calculating a first distance in a substantially vertical direction and a second distance in a substantially horizontal direction;

the step of determining from the information retrieved about the reference authentic version of the identity document, the distance between corresponding features in the reference authentic version of the identity document, comprises the step of determining a first distance between the corresponding features in a substantially vertical direction and a second distance between the corresponding features in a substantially horizontal direction; and the step of calculating a scaling factor $\gamma_{x,y}$ from the ratio of the distance between the two selected features in the presented identity document and the distance between corresponding features in the reference authentic version of the identity document, comprises calculating a first ratio between the first distances in the presented identity document and the reference authentic version of the identity document, and a second ratio between the second distances in the presented identity document and the reference authentic version of the identity document.

According to a second aspect of the invention there is provided an identity document digital image correction system comprising means adapted to carry out the steps of the identity document digital image correction method of the first aspect.

According to a third aspect of the invention there is provided an Identity document digital image correction computer program, tangibly embodied on a computer readable medium, the computer program product including instructions for causing a computer to execute the identity document digital image correction method of the first aspect.

BRIEF DESCRIPTION OF THE DRAWING

An embodiment of the identity document digital image correction method is herein described, by way of example of only, with reference to the accompanying figures in which:

FIG. 1 is a flowchart of the identity document digital image correction method of the preferred embodiment.

DETAILED DESCRIPTION OF THE INVENTION

A digital scanner comprises a glass plate onto which a document is placed. The scanner image acquisition system (mirrors, lens, filter and CCD array) make up the scan head mounted at a fixed distance from the glass plate. In use, the scan head is moved slowly across the document by a belt that is attached to a stepper motor. The image of the document is reflected by one or more mirrors onto a lens. The lens focuses the image through a filter on the CCD array. Scanner Resolution is the measurement of the resolving power of the scanner's optics and is expressed as dots per inch (dpi), but it is more accurately described as pixels per inch (ppi). A scanner's sensor takes an analog image and digitizes it line by line. Thus, a scanner's resolution is determined by (a) the number of sensors in a single row (x-direction sampling rate) of the CCD or CIS array; and (b) the precision of the stepper motor (y-direction sampling rate).

Thus, the number of pixels acquired in a image of a scanned object is defined by height multiplied by width multiplied by a certain pixel density (ppi). For example, a 5×7 photograph scanned at 300 DPI would produce a digital image that is 1500 pixels wide and 2100 pixels in height. Since the distance between a document placed on the scanner's glass plate and the scan head; and the scanner's resolution (pixel density) is known, it is possible to work out the distance between individual elements within the digital image of the scanned document.

In contrast, digital camera resolution is normally measured by the total number of pixels it can capture (e.g. 10 MP, or 10,000,000 pixels). Similarly, since the distance may vary between an object being photographed and the corresponding digital camera, it can be difficult to ascribe a meaningful ppi resolution FIGURE for a resulting digital image. In a conventional scanner, the angle with which a scanned item is presented to the scan head is fixed in one dimension by the necessity of placing the scanned item on the glass plate of the scanner. However, when acquiring a digital image of an object with a digital camera, the object may be positioned at any angle to the digital camera. Consequently, the resulting digital image may be subject to perspective distortion (so that the apparent relative distances between elements of the digital image may differ from what might otherwise be expected).

Identity documents typically comprise a number of visible features which may be used to assess the authenticity of the identity document. These features may include, without limitation, details of the issuing source, the name/surname of the owner, the nationality/city of residence of the owner, a photograph and signature of the owner, an issue date, a stamp of an issuing authority, an expiration date, an identity document number. The specific features included in an identity document and their positioning relative to each other may vary markedly from one identity document to the next, depending on a variety of factors, including type (passport, driving licence, identity card etc.), country, issue date etc.

The pattern of these features effectively forms signature with which a digital image of a presented identity document can be compared against digital images of known, authentic identity documents of the same type, class and issuance etc.

The digital images of known, authentic identity documents are typically obtained by conventional scanners. Since as mentioned above, images obtained from scanners differ from those obtained from digital cameras, in terms of their metrics for resolution and capability for determining distance between individual features in the images. Thus, in assessing the authenticity of a presented identity document, it is necessary to determine the exact distance between individual items in the image obtained by a digital camera of the identity document. This information will be used as a basis for the comparison of the image of the presented identity document and the image of the reference authentic identity document.

Referring to FIG. 1, a preferred embodiment of the identity document digital image correction method comprises a first step of identifying 10 the type, class and issue of a presented identity document from a plurality of features in a digital image thereof. The preferred embodiment then retrieves 12 (from a reference identity document repository [not shown]) information about a reference authentic version of an identity document of the same type, class and issue as the presented identity document. The information includes details of distances recorded in physical measurement units between individual features in the reference authentic version of the identity document.

Following this, the preferred embodiment comprises a next step of allowing 14 a user to select at least two features in the digital image of the presented identity document, to act as two anchor points $(p_1, p_2)^{pres}$ for subsequent calculations. Preferably, the anchor points $(p_1, p_2)^{pres}$ should be spaced as far apart as possible in both the horizontal and vertical axes. Indeed, ideally, the anchor points $(p_1, p_2)^{pres}$ should ideally be located at the diagonally opposed corners of the presented identity document. The purpose of selecting anchor points with the greatest spacing apart is to facilitate compensation for perspective (and/or other) image deformation in the digital image of the presented identity document. The preferred embodiment comprises a next step of calculating 16 the distance (in terms of the number of pixels) between the two anchor points $(p_1, p_2)^{pres}$ in both the horizontal and vertical directions. For the sake of clarity, this distance will henceforth be known as the presented anchor point intervening distance $(\alpha_{x,y}^{pres} = |p_1 - p_2|_{x,y}^{pres})$ The preferred embodiment then determines 18 from the information retrieved about the reference authentic version of the identity document, the distance (in physical measurement units) between corresponding features/anchor points in the reference authentic version of the identity document. For the sake of clarity, this distance will henceforth be known as the authentic anchor point intervening distance $(\alpha_{x,y}^{auth} = |p_1 - p_2|_{x,y}^{auth})$.

The preferred embodiment then calculates 20 a scaling factor $\gamma_{x,y}$ (in both the x and y dimensions) from the ratio of the presented anchor point intervening distance and the authentic anchor point intervening distance $$\gamma_{x,y} = \frac{\alpha_{x,y}^{pres}}{\alpha_{x,y}^{auth}}$$

The preferred embodiment then applies 22 the scaling factor to pixel-based measurements of features in the digital image of the presented identity document and converts the pixel-based measurements into their physical distance measurement equivalents. These physical distance measurements can be compared 24 with corresponding measurements of features in the authentic version of the identity document. The results of the comparison are used to assess 26 the authenticity of the presented identity document.

Modifications and alterations may be made to the above invention without departing from the scope of the arranged.

The invention claimed is:

1. Identity document digital image correction method which corrects a digital image of a presented identity document acquired with an imaging device of a first kind using an authentic reference identity document acquired with an imaging device of a second kind, comprising the steps of:
    identifying the type, class and issue of a presented identity document from a plurality of features in a digital image thereof;
    retrieving from a reference identity document repository, information about a reference authentic version of an identity document of the same type, class and issue as the presented identity document;
    allowing a user to select two features in the digital image of the presented identity document;
    calculating the distance between the two selected features;
    determining from the information retrieved about the reference authentic version of the identity document, the distance between corresponding features in the reference authentic version of the identity document;
    calculating a scaling factor $\gamma_{x,y}$ from the ratio of the distance between the two selected features in the presented identity document and the distance between corresponding features in the reference authentic version of the identity document;
    correcting one or more measurements of features in the digital image of the presented identity document by applying the scaling factor thereto
    wherein:
    the corrected one or more measurements of features in the digital image of the presented identity document are compared with corresponding measurements of features in the authentic reference identity document and results of this comparison are used to assess the authenticity of the presented identity document.

2. The identity document digital image correction method as claimed in claim 1 wherein
    the step of calculating the distance between the two selected features comprises the step of calculating a first distance in a substantially vertical direction and a second distance in a substantially horizontal direction;
    the step of determining from the information retrieved about the reference authentic version of the identity document, the distance between corresponding features in the reference authentic version of the identity document, comprises the step of determining a first distance between the corresponding features in a substantially vertical direction and a second distance between the corresponding features in a substantially horizontal direction; and
    the step of calculating a scaling factor $\gamma_{x,y}$ from the ratio of the distance between the two selected features in the presented identity document and the distance between corresponding features in the reference authentic version of the identity document, comprises calculating
    a first ratio between the first distances in the presented identity document and the reference authentic version of the identity document, and
    a second ratio between the second distances in the presented identity document and the reference authentic version of the identity document.

3. Identity document digital image correction system comprising means adapted to carry out the steps of the identity document digital image correction method of claim 1.

4. An identity document digital image correction computer program, tangibly embodied on a non-transitory computer readable medium, the computer program product including instructions for causing a computer to execute the identity document digital image correction method as claimed in claim 1.

* * * * *